United States Patent [19]

Nakagawa et al.

[11] Patent Number: 5,924,186

[45] Date of Patent: Jul. 20, 1999

[54] MANUFACTURING METHOD FOR MAGNETIC BEARING SYSTEM

[75] Inventors: Tohru Nakagawa, Hirakata; Katsuhiko Asai, Toyonaka; Yoshihiro Ikemoto; Isao Tashiro, both of Hirakata, all of Japan

[73] Assignee: Matsushita Electric Industrial Co., Ltd., Japan

[21] Appl. No.: 08/805,746

[22] Filed: Feb. 25, 1997

[30] Foreign Application Priority Data

Feb. 29, 1996 [JP] Japan .................................. 8-042585

[51] Int. Cl.⁶ .................................................. H02K 15/00
[52] U.S. Cl. ............................................. 29/602.1; 29/596
[58] Field of Search ............................... 384/446; 29/596, 29/602.1; 310/90.5

[56] References Cited

U.S. PATENT DOCUMENTS

| | | | |
|---|---|---|---|
| 5,060,364 | 10/1991 | Scherer | 29/596 |
| 5,095,610 | 3/1992 | Schultz et al. | 29/596 |
| 5,226,713 | 7/1993 | Matsumura | 384/446 |

*Primary Examiner*—Timothy V. Eley
*Assistant Examiner*—Benjamin M. Halpern
*Attorney, Agent, or Firm*—Parkhurst & Wendel, L.L.P.

[57] ABSTRACT

A radial electromagnetic attraction stator of a magnetic bearing system is manufactured by forming laminated core pieces as divisions of a laminated core each having a unit number of pole teeth, winding wires around pole piece portions of the laminated core pieces with insulators interposed, assembling a predetermined number of the laminated core pieces wound with the wires and fixing joined portions of the laminated core pieces. This manufacturing method prevents spaces in which the wires are wound from being limited by adjacent pole teeth unlike the conventional integral laminated core, permits winding the wires in a maximum number of turns in open spaces and allows to obtain the radial electromagnetic attraction stator having a high space factor, thereby being capable of providing a magnetic bearing system having a high load capacity and usable as a bearing capable of enhancing performance of production appliances such as working appliance and vacuum pumps.

2 Claims, 5 Drawing Sheets

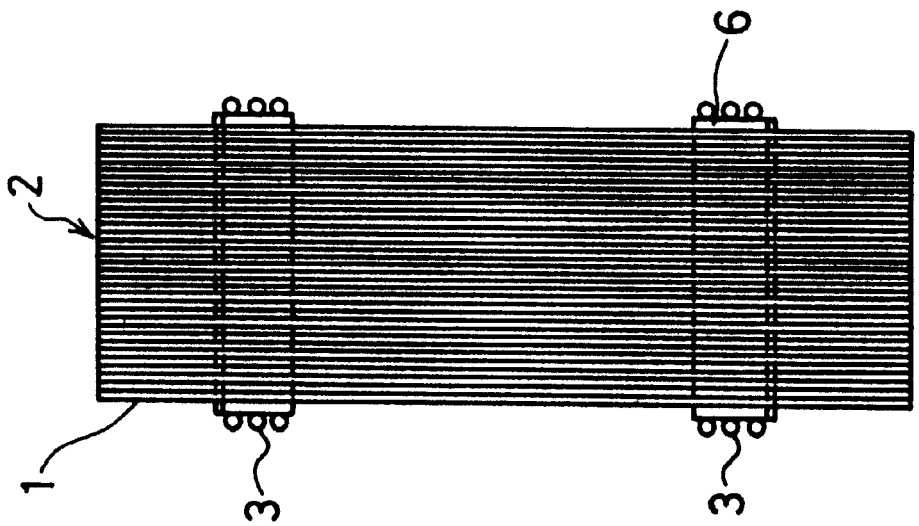
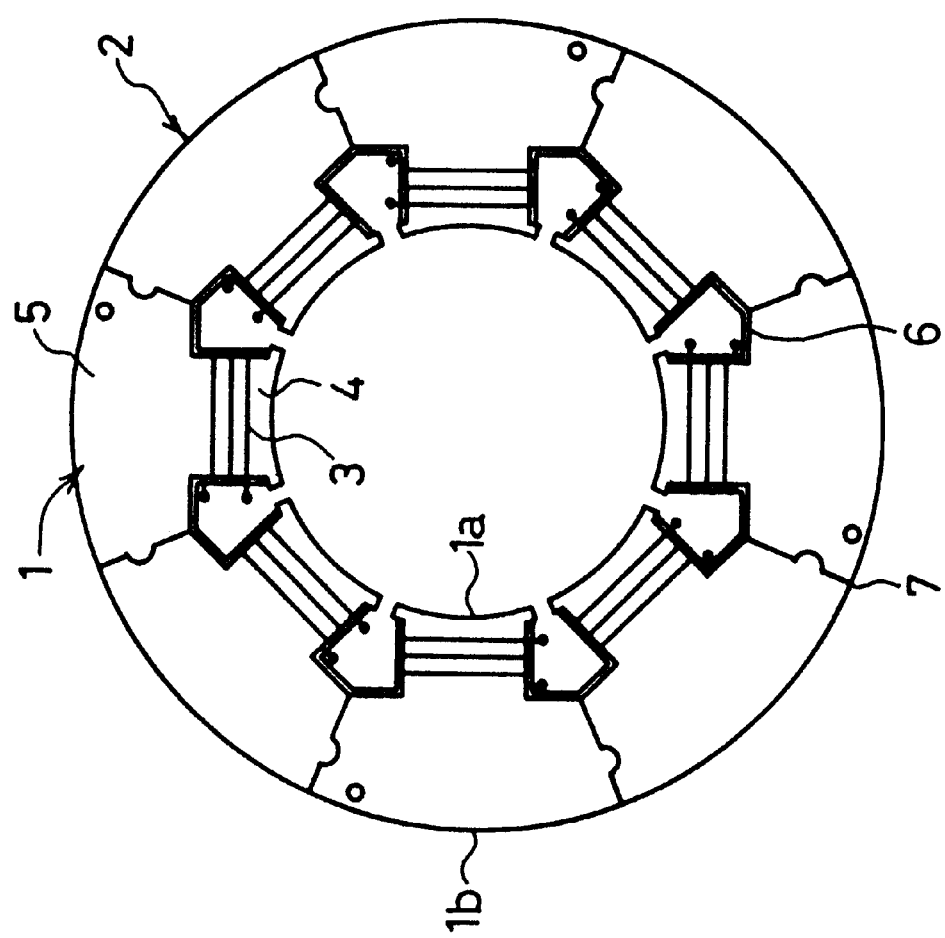

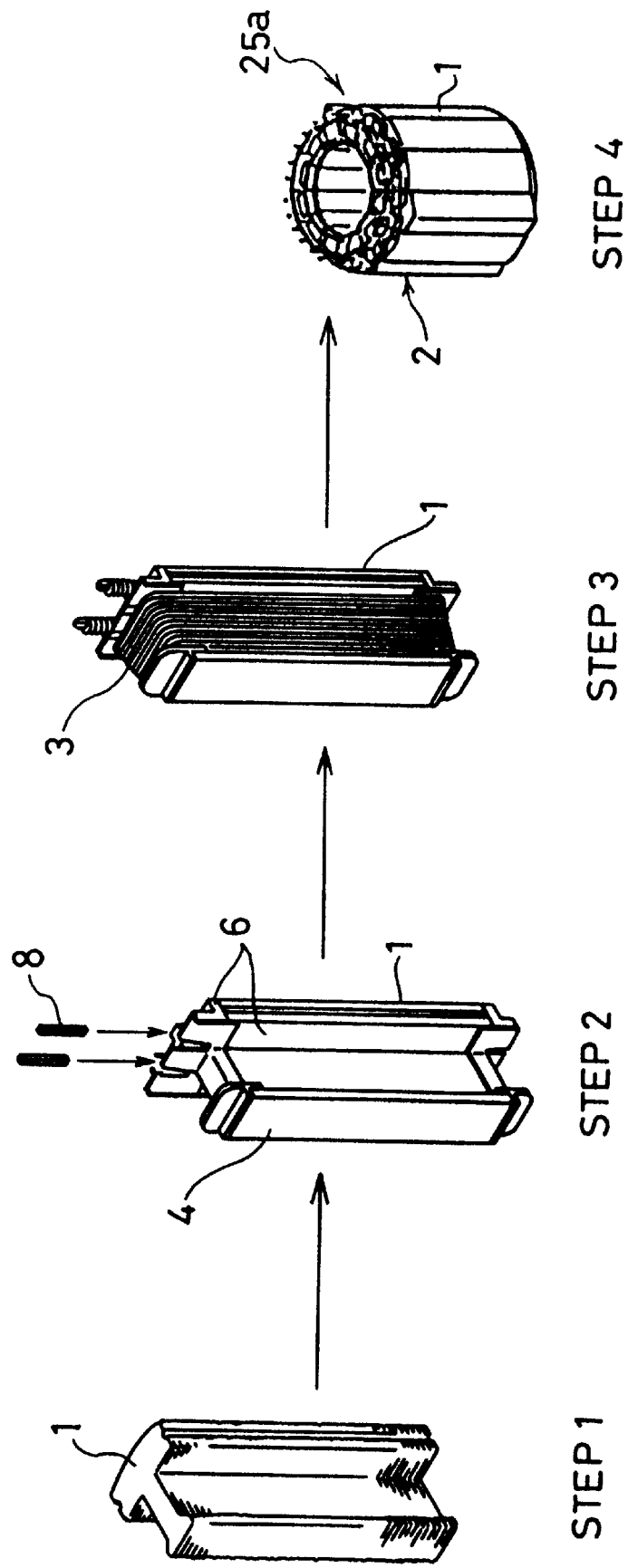

5,924,186

MANUFACTURING METHOD FOR MAGNETIC BEARING SYSTEM

SPECIFICATION

1. Field of the Invention

The present invention relates to a manufacturing method for a magnetic bearing system which supports a rotating shaft or a rotating body in the air by magnetic attractions generated by electromagnets.

2. Background of the Invention

A magnetic bearing system which supports a rotating shaft contactlessly in the air by utilizing magnetic attractions generated by electromagnets has characteristics that usable in a vacuum, that it causes little bearing loss, that requires no lubricant, that produces low noise and that is free from maintenance.

The known magnetic bearing system consists of a cylindrical shell which is disposed outside a rotating shaft supported by the bearing system and has an axis aligned with a center axis of the rotating shaft, electromagnetic attraction stators (hereinafter referred to as radial electromagnetic stators) and electromagnetic attraction rotors which are disposed in opposition to each other on an inner circumferential surface of the shell and an outer circumferential surface of the rotating shaft so as to compose a radial bearing of electromagnetic attractions, electromagnetic attraction stators which are disposed on the inner circumferential surface and the outer circumferential surface of the rotating shaft so as to compose a bearing in a thrust direction of electromagnetic attractions (hereinafter referred to as thrust electromagnetic attraction stators) of magnetic attractions and a disk-shaped thrust plate.

The bearing system which has the configuration described above allows the rotating shaft to rotate while being maintained at a constant location so as not to be brought into contact with the shell by controlling electric currents supplied to the radial electromagnetic attraction stators and the thrust electromagnetic attraction stators so as to control electromagnetic forces (electromagnetic attractions) of these stators.

The radial electromagnetic attraction stator described above is manufactured by punching out, from a steel plate, stator cores each having a plurality of pole teeth which are to be used as magnetic poles, laminating these stator cores and winding a wire around the pole teeth of the laminated stator cores (hereinafter referred to as a laminated core). Electromagnetic attractions are generated by supplying an electric current to this winding for supporting the rotating shaft in a contactless condition.

However, the manufacturing method for the radial electromagnetic attraction stator of the known magnetic bearing system possesses problems described below.

1. Since the radial electromagnetic attraction stator is manufactured by laminating the integral stator cores each having a plurality of pole teeth, the wire is wound around the pole teeth of the laminated core at a density within a certain limit or cannot be wound at a high density. A space factor, or a percentage of a space occupied by the wire in an actual winding space (hereinafter referred to as a conductor space factor), is 30 to 40%. Accordingly, electromagnetic attractions which are generated by supplying an electric current to the winding of the laminated core are limited and, when this limit is exceeded, the rotating shaft supported by the bearing system is vibrated or inclined. As a result, the magnetic bearing system is limited for use in heavy load condition or can hardly be used for supporting a heavy load.
2. For configuring the magnetic bearing system so as to be usable for supporting a heavier load, it is obliged to enlarge the laminated core for enhancing the magnetic attractions, thereby enlarging the magnetic bearing system and working appliance. As a result, manufacturing equipment such as a press and a metallic mold for punching out each stator core is enlarged and more expensive, thereby lowering productivity.
3. When the laminated core is prolonged for enhancing the electromagnetic attractions, it is necessary to prolong the rotating shaft. A prolonged rotating shaft has a higher natural frequency and is vibrated or cannot rotate accurately. A tool spindle of working appliance in particular can hardly work with high precision while being rotated at a high speed.

DISCLOSURE OF THE INVENTION

A primary object of the present invention is to solve the problems described above, or provide a manufacturing method for a magnetic bearing system which is highly sophisticated so as to have a high load capacity and is usable as a bearing capable of enhancing performance of production appliances such as a working appliance and vacuum pumps.

For accomplishing this object, the method according to the present invention is configured to manufacture a magnetic bearing system which comprises a cylindrical shell disposed outside a rotating shaft to be supported by the bearing system and having an axis aligned with a center axis of the rotating shaft, and stators and rotors which are disposed in opposition to each other on an inner circumferential surface of the shell and an outer circumferential surface of the rotating shaft so as to compose a bearing in a radial direction of electromagnetic attractions, and characterized in that it is configured to compose the stator by forming laminated core pieces as divisions of the laminated core each having a unit number of pole teeth, winding wires around pole teeth portions of the laminated core pieces, preliminarily assembling a predetermined number of the laminated core pieces wound with the wires so as to form the laminated core and fixing joined portions of the laminated core pieces.

According to the manufacturing method described above which divides the laminated core into the laminated core pieces each having the unit number of pole teeth, the laminated core prevents spaces in which the wires are wound from being limited by adjacent pole teeth unlike the conventional integral laminated core and permits winding the wires in a maximum number of turns in open spaces, thereby making it possible to obtain a stator having a high conductor space factor. Further, the division of the laminated core into the laminated core pieces each having the unit number of pole teeth facilitates to wind the wires in regular rows around the pole teeth portions and makes it possible to wind the wire at a high density. This method actually allows a conductor space factor to reach 60 to 70%. Furthermore, the winding at a high density reduces protruding widths of the winding from both sides of the laminated core piece, thereby making it possible to save winding spaces.

BRIEF DESCRIPTION OF THE DRAWINGS

FIGS. 3(a) and 3(b) are plan view and a sectional view illustrating a radial electromagnetic attraction stator used in the magnetic bearing system shown in FIG. 1;

FIG. 4 shows views illustrating steps for manufacturing a radial electromagnetic attraction stator used in the magnetic bearing system shown in FIG. 1.

DESCRIPTION OF THE EMBODIMENT

Now, an embodiment of the magnetic bearing system according to the present invention will be described with reference to the accompanying drawings.

Figure 1:
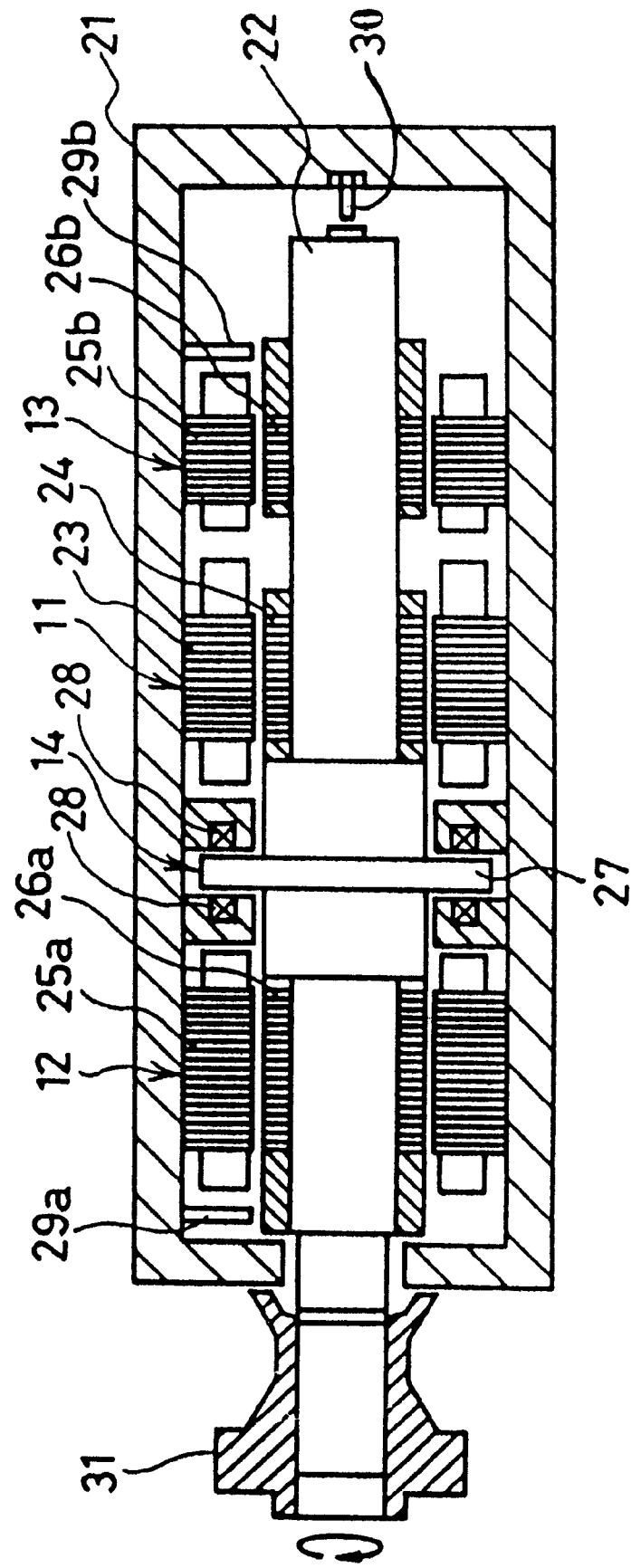
FIG. 1 is a longitudinal sectional view illustrating a magnetic bearing system manufactured in an embodiment of the present invention.

FIG. 1 is a longitudinal sectional view of the magnetic bearing system according to the present invention.

In FIG. 1, a reference numeral 21 represents a cylindrical shell which is disposed outside a rotating shaft 22 supported by the bearing system and has an axis aligned with a center axis of the rotating shaft 22. A motor 11 for imparting a rotating force to the rotating shaft 22, a first radial bearing 12 and a second radial bearing 13 for supporting the rotating shaft 22 in a radial direction in the air, and a third thrust bearing 14 for supporting the rotating shaft 22 in a thrust direction in the air are disposed in the shell 21.

The motor 11 is composed of a motor stator 23 disposed on an inner circumferential surface of the shell 21 and a motor rotor 24 disposed on an outer circumferential surface of the rotating shaft 22 with a certain space reserved from the motor stator 23. The motor 11 is disposed between the third thrust bearing 14 and the second radial bearing 13.

The first and second radial bearings 12 and 13 are composed of a pair of electromagnetic attraction stators (hereinafter referred to as radial electromagnetic attraction stators) 25a and 25b disposed on the inner circumferential surface of the shell 21 at locations corresponding to ends of the rotating shaft 22, and electromagnetic attracting rotors 26a and 26b disposed on the outer circumferential surface of the rotating shaft 22 with certain space gaps reserved from the radial electromagnetic attraction stators 25a and 25b.

The third thrust bearing 14 is composed of a disk-like thrust plate 27 disposed on the outer circumferential surface of the rotating shaft 22 so as to be perpendicular to the rotating shaft 22 and a pair of electromagnetic attraction stators (hereinafter referred to as thrust electromagnetic attraction stators) 28 disposed on the inner circumferential surface of the shell 21 so as sandwich the thrust plate 27.

The radial electromagnetic attraction stators 25a, 25b and the thrust electromagnetic attraction stators 28 are disposed on the inner circumferential surface of the shell 21 so as to be concentrical with the rotating shaft 22.

Further, position detecting displacement sensors 29a, 29b and 30 for detecting positions of the rotating shaft 22 in the radial direction and the thrust direction are disposed inside the shell 21. A tool 31 such as a cutting tool or a grind stone can be attached to a tip of the rotating shaft 22.

The rotating shaft 22 is generally made of a ferromagnetic material for preventing lowering of magnetic efficiencies of the motor rotor 24, and the radial electromagnetic attraction stators 25a and 25b. Further, the rotors 24, 26a and 26b are made of silicon steel sheets, and silicon steel sheets are fitted in the rotating shaft 22.

Explanation will be made of operations of the magnetic bearing system which is composed as described above.

The rotating shaft 22 is rotated with a driving force generated by the motor rotor 24. The tool 31 performs a work such as polishing or cutting by utilizing the rotation. The driving force of the motor rotor 24 is controlled by controlling an electric current supplied to a wire (not shown) wound around the motor stator 23.

In this condition, position data of the rotating shaft 22 in the radial direction is detected by the displacement sensors 29a and 29b for detecting position in the radial direction, and position data in the thrust direction is detected by the displacement sensor 30 for detecting position in the thrust direction respectively.

On the basis of the position data detected by the sensors 29a, 29b and 30, electromagnetic attractions of the first radial bearing 12, the second radial bearing 13 and the thrust bearing 14 are controlled by a feedback control circuit so that the rotating shaft 22 rotates at a constant location without being brought into contact with the inside surface of the shell 21. The axis of the rotating shaft 22 is ordinarily aligned with the center axis of the rotation.

Figure 2:
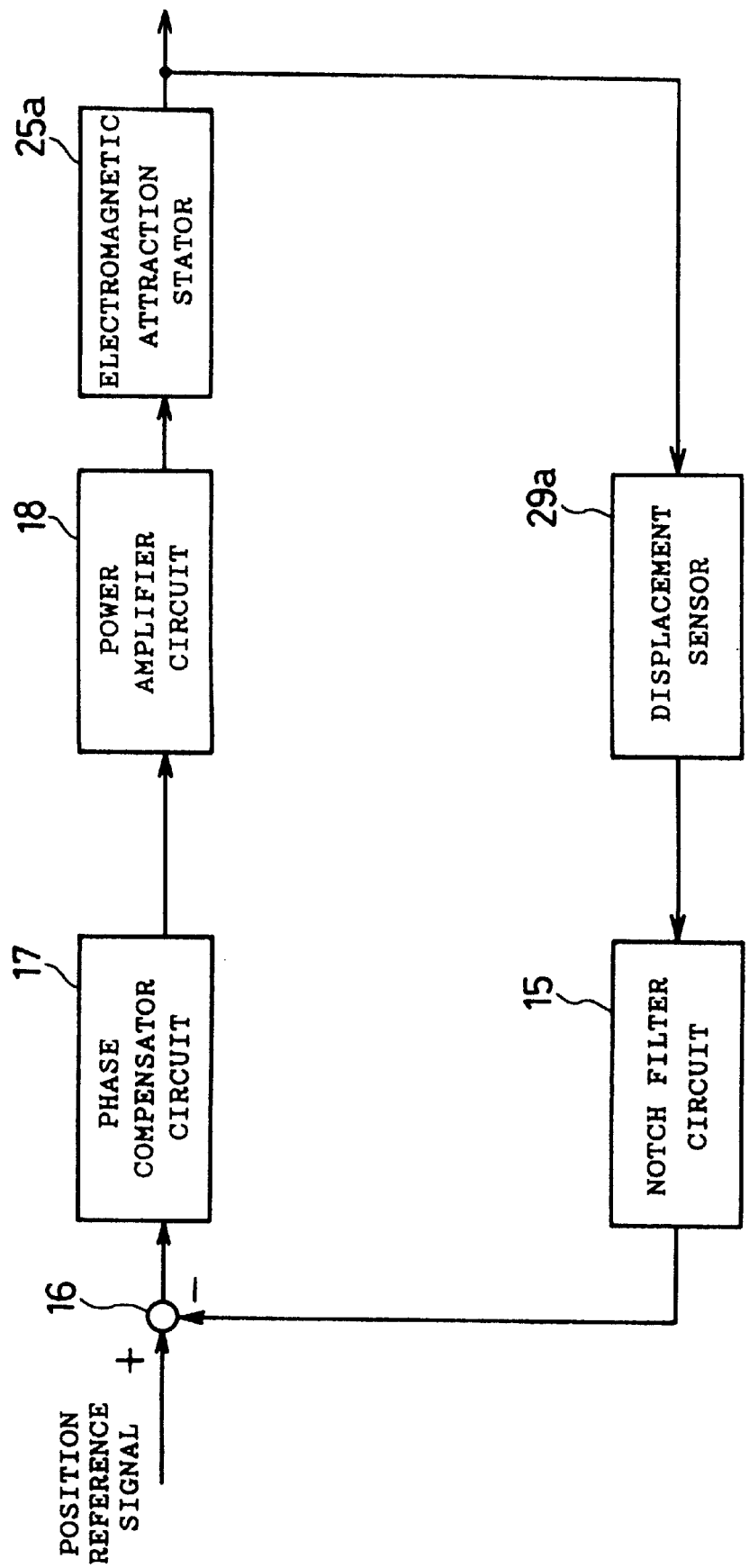
FIG. 2 is a block diagram illustrating a control circuit for the magnetic bearing system shown in FIG. 1.

The control of the rotating location by the first radial bearing 12 will be described with reference to FIG. 2 illustrating a block diagram of the rotating position control circuit. Positional controls by the second radial bearing 13 and the third thrust bearing 14 are similar and will not be described.

Position data in the radial direction of the rotating shaft 22 is detected by the radial position detecting displacement sensor 29a and input as a position signal in the radial direction of the rotating shaft 22 into a notch filter circuit 15. This notch filter circuit 15 attenuates the input position signal within a range of natural frequencies of normal and reverse rotations of the rotating shaft 22 and feeds back the signals to a deviation circuit 16. The deviation circuit 16 calculates a difference between a position standard signal for the rotating shaft 22 and an output signal from the notch filter circuit 15, and outputs a deviation signal to a phase compensator circuit 17.

The phase compensator circuit 17 generates a phase compensation signal by multiplying the deviation signal by a constant of proportionality, integrating the deviation signal, differentiating the deviation signal or executing a combination of these calculations, and outputs the phase compensation signal to a power amplifier circuit 18. On the basis of the output signal from the phase compensator circuit 17, the power amplifier circuit 18 supplies an electric current to the winding of the radial electromagnetic attraction stator 25a of the first radial bearing 12 which is to be controlled.

By controlling an electric current supplied to the winding of the radial electromagnetic attraction stator 25a as described above, an electromagnetic attraction generated by the radial electromagnetic stator 25a is controlled, whereby a position of the rotating shaft 22 in the radial direction is controlled by the first radial bearing 12.

A structure of the radial electromagnetic attraction stator 25a of the first radial bearing 12 will be described in details with reference to the accompanying drawings. FIGS. 3(a) and 3(b) are a plan view and a sectional view illustrating the laminated core which composes the radial electromagnetic attraction stator according to the present invention. The radial electromagnetic attraction stator 25b of the second radial bearing 13 has a structure which is the same as that of the radial electromagnetic attraction stator 25a.

In FIGS. 3(a) and 3(b), a reference numeral 1 represents a laminated core piece which is formed as a division of a laminated core 2 having a unit number of pole teeth, and consists of a pole teeth portion 4 having a winding 3 and functioning as a magnetic pole, and a yoke portion 5 functioning as a magnetic circuit. The laminated core piece 1 is composed by punching out, from a steel plate, flat plates having the T-shape of the laminated core piece shown in the drawing, laminating the flat plates and fixing outer circumferential surfaces 1b and inner circumferential surfaces 1a consisting of the pole teeth in a laminating direction.

The radial electromagnetic attraction stator 25a is composed by winding wires 3 around the pole teeth portions 4 of the laminated core pieces 1 with insulators 6 interposed, combining a predetermined number of the laminated core pieces 1 and fixing joined portions 7 of the laminated core pieces 1 by laser welding.

By forming cavities in joined portions 7 of the laminated core pieces 1 which are to be welded, it is possible to prevent weld beads from coming out to surfaces of the laminated core at a stage of the laser welding. The insulators 6 are made of insulating paper.

Steps for manufacturing the radial electromagnetic attraction stator 25a will be described in details with reference to FIG. 4.

FIG. 4 shows steps to manufacture the radial electromagnetic attraction stator 25a in a due sequence. As shown in FIG. 4, manufacturing steps for the radial electromagnetic attraction stator 25a consist of a core supply step to punch out plates having the shape of the laminated core piece from a steel plate with a press, and manufacture the laminated core pieces 1 by laminating and fixing the plates (step 1), an insulator assembling step to dispose the insulators 6 around the pole teeth portions 4 of the laminated cores 1 (step 2), a winding step to wind wires around the laminated core pieces 1 with the insulators 6 interposed (step 3), and a laser fixing step to preliminarily assemble the laminated core pieces 1 so as to compose the laminated core 2 and fix the joined portions of the laminated core pieces 1 by laser welding (step 4). In FIG. 4, a reference numeral 8 represents electric terminals for connecting ends of the wire 3.

Figure 5A:
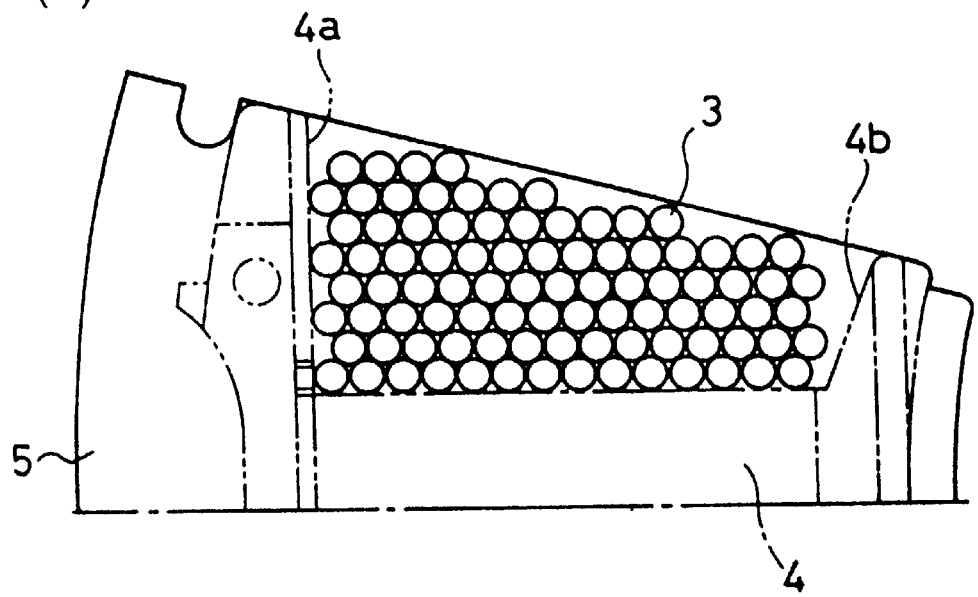
FIGS. 5(a) and 5(b) are partial sectional diagrams descriptive of conditions of windings around laminated core pieces of the magnetic bearing system shown in FIG. 1.
Figure 5B:
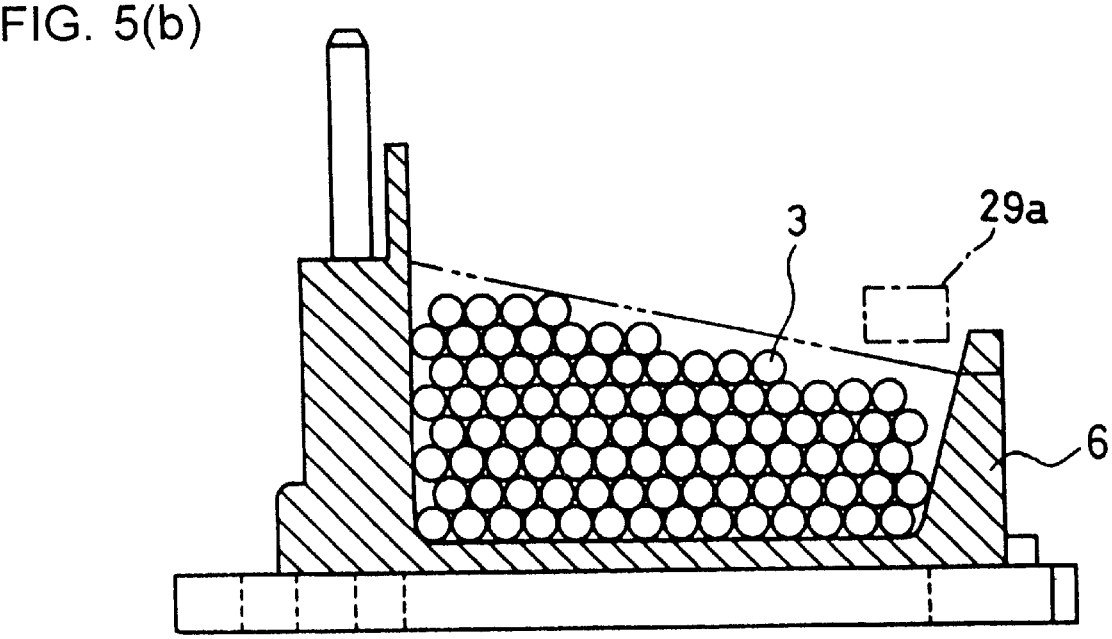

FIGS. 5(a) and 5(b) are partial sectional views descriptive of a condition of the wire 3 around the laminated core pieces 1. FIG. 5(a) is a plan sectional view of the laminated core piece and FIG. 5(b) is a side sectional view of the laminated core piece: the insulator 6 being omitted in FIG. 5(a).

The wire 3 can be wound in regular rows around the pole teeth portion 4 of the laminated core 1 as shown in the drawings. Actually, the winding is formed so as to have a large outside diameter at a root 4a of the pole teeth portion 4 and a small outside diameter at a tip of the pole teeth portion, or have a pyramidal form slanting from the root to the tip.

By forming the laminated core pieces 1 as divisions of the laminated core 2 each having four pole teeth portions 4 as described above, it is possible to prevent spaces in which wires are wound from being limited by adjacent pole teeth, wind the wires 3 in a maximum number of turns in open spaces and obtain the radial electromagnetic attraction stator 25a having a high conductor space factor. In addition, it is possible to obtain a conductor space factor of 60 to 70% which is a theoretical limit value of the winding 3 in regular rows by forming the wires 3 in regular rows at a high density in each unit of the pole teeth of the pole pieces 1.

Accordingly, the present invention makes it possible to enhance electromagnetic attractions generated by the radial electromagnetic attraction stator 25a, thereby obtaining a magnetic bearing system having a higher load capacity. By using this magnetic bearing system in a working appliance, a working feed can be accelerated or a larger working margin can be reserved for working in a shorter time. Further, evacuation can be completed in a shorter time by using the magnetic bearing system in a vacuum pump.

When a magnetic bearing system having a load capacity which is the same as that of the conventional one is to be obtained, the present invention makes it possible to configure the magnetic bearing system compacter. For manufacturing a compacter magnetic bearing system, sizes of the laminated core 2 can be reduced in the radial direction and the laminating direction.

Further, the present invention which permits reducing the widths of the wire 3 from both the sides 4a and 4b of the pole teeth portions 4 of the laminated core pieces 1 makes it possible to reserve a margin in a space between the pole teeth, portions 4, thereby permitting reducing a size of the magnetic bearing system in its radial direction. On the other hand, the reduction of the protruding widths of the wire 3 permits broadening the pole teeth portions 4 and enlarging the magnetic circuit, thereby making it possible to enhance the electromagnetic attractions of the radial electromagnetic attraction stator 25a and obtain a magnetic bearing system which has the high load capacity described above.

Furthermore, the present invention which permits the reduction of a size in the laminating direction and the narrowing of the protruding widths of the wire 3 by enhancing the load capacity makes it possible to reduce a size in the direction of the rotating shaft. Accordingly, the present invention makes it possible to shorten the rotating shaft 22, enhance a natural frequency of the rotating shaft 22 and reduce vibrations of the rotating shaft 22. In particular, the present invention makes it possible to rotate the rotating shaft 22 accurately at a high speed. As a result, working can be performed with high precision at a high rotating speed when the magnetic bearing system is used in a working appliance.

Moreover, the present invention which forms the laminated core pieces 1 as divisions of the laminated core 2 each having a unit number of pole teeth portions 4 makes it possible to punch out the laminated core pieces 1 with a press and permits using a small press and a small metallic mold, thereby remarkably enhancing productivity.

In addition, the narrowing of the protruding widths of the wire 3 makes it possible to dispose the sensor 29a for detecting radial position in the vicinity of a tip of a vertical surface of the pole teeth portions 4 of the laminated core 2, or in the winding space for the wires 3, as shown in FIG. 5(b), thereby making it possible to reduce a size of the magnetic bearing system in the longitudinal direction.

Though the embodiment of the present invention has been described above as a method for manufacturing a rotating spindle equipped with the tool 31 such as a grinding tool, it is needless to say that the method according to the present invention is applicable also to manufacturing of bearing systems for vacuum pumps and others for supporting rotating bodies.

What is claimed is:

1. A method for manufacturing a magnetic bearing system that supports a rotating shaft, said method comprising:
   providing a rotating shaft to be supported by said magnetic bearing system;
   disposing a cylindrical shell outside said rotating shaft and having an axis aligned with a center axis of said rotating shaft;
   disposing stators and rotors in opposition to each other on an inner circumferential surface of said cylindrical shell and an outer circumferential surface of said rotating shaft so as to compose a radial bearing of electromagnetic forces;

forming said stators from a plurality of laminated individually separate core pieces as sectors of a laminated core, each individually separate core piece having a unit number of pole teeth;

winding wires around the pole teeth portions of each individually separate core piece so as to produce separate windings around each core piece;

preliminarily assembling a predetermined number of individually separate core pieces after winding the wires around each individually separate core piece so as to form said laminated core; and fixing joined portions of the individually separate core pieces.

2. A manufacturing method for a magnetic bearing system according to claim 1 wherein each winding wound around said pole teeth portions of a respective core piece has an outside diameter that is large at roots of said pole teeth portions of said respective core pieces and reduced toward tips of said pole teeth portions of said respective core pieces.

* * * * *